(12) United States Patent
Abolfazlian et al.

(10) Patent No.: US 9,611,837 B2
(45) Date of Patent: Apr. 4, 2017

(54) APPARATUS FOR ACCESSING THE NACELLE OF A WIND TURBINE AND ASSOCIATED METHODS

(75) Inventors: Mazyar Abolfazlian, Brabrand (DK); Morten Mogensen, Hvidovre (DK); Jan Riis Bovbjerg, Randers (DK)

(73) Assignee: Vestas Wind Systems A/S, Aarhus N. (DK)

( * ) Notice: Subject to any disclaimer, the term of this patent is extended or adjusted under 35 U.S.C. 154(b) by 723 days.

(21) Appl. No.: 14/005,729

(22) PCT Filed: Mar. 14, 2012

(86) PCT No.: PCT/DK2012/050076
§ 371 (c)(1),
(2), (4) Date: Mar. 25, 2014

(87) PCT Pub. No.: WO2012/122989
PCT Pub. Date: Sep. 20, 2012

(65) Prior Publication Data
US 2014/0219812 A1    Aug. 7, 2014

Related U.S. Application Data

(60) Provisional application No. 61/453,810, filed on Mar. 17, 2011.

(30) Foreign Application Priority Data

Mar. 21, 2011   (DK) ................................ 2011 70130

(51) Int. Cl.
*F03D 1/00*   (2006.01)
*F03D 11/04*  (2006.01)
(Continued)

(52) U.S. Cl.
CPC ................ *F03D 11/04* (2013.01); *F03D 1/00* (2013.01); *F03D 1/001* (2013.01); *F03D 1/003* (2013.01);
(Continued)

(58) Field of Classification Search
CPC .......... F03D 1/003; F03D 13/20; F03D 17/00; F05B 2240/14
(Continued)

(56) References Cited

U.S. PATENT DOCUMENTS 4,557,666 A    12/1985  Baskin et al.
4,928,615 A *   5/1990  Williams .................. E05C 9/06
                                                 114/201 R
(Continued)

FOREIGN PATENT DOCUMENTS

CA         2669371 A1    12/2009
DE   WO 2009132671 A2 *  11/2009    ............. F03D 1/003

OTHER PUBLICATIONS

International Searching Authority, Search Report and Written Opinion issued in corresponding PCT Application No. PCT/DK2012/050076 dated May 23, 2012, 12 pages.
(Continued)

*Primary Examiner* — Kevin Murphy
(74) *Attorney, Agent, or Firm* — Wood Herron & Evans LLP

(57) ABSTRACT

A wind turbine includes a tower having an interior, an exterior, a lower end and an upper end; a nacelle coupled to the tower adjacent the upper end and movable to define at least two yaw positions of the nacelle; a rotor coupled to the nacelle; and an access apparatus disposed about the tower adjacent the upper end thereof, the access apparatus defining a passageway into the nacelle that is exterior of the tower, and the access apparatus providing access to the nacelle in
(Continued)

the at least two yaw positions of the nacelle. A method for transporting equipment and personnel to the nacelle using the access apparatus is disclosed. A method for assembling a wind turbine having such an access apparatus is also disclosed.

21 Claims, 8 Drawing Sheets

(51) Int. Cl.
      *F03D 80/00*       (2016.01)
      *F03D 13/20*       (2016.01)

(52) U.S. Cl.
    CPC ............ *F03D 13/20* (2016.05); *F03D 80/00* (2016.05); *F05B 2240/14* (2013.01); *F05B 2240/912* (2013.01); *Y02E 10/726* (2013.01); *Y02E 10/728* (2013.01); *Y10T 29/49245* (2015.01)

(58) Field of Classification Search
    USPC ........................................ 416/244 R, DIG. 6
    See application file for complete search history.

(56) References Cited

U.S. PATENT DOCUMENTS

| | | |
|---|---|---|
| 6,998,729 B1 | 2/2006 | Wobben |
| 7,471,010 B1 | 12/2008 | Fingersh |
| 7,934,585 B2 * | 5/2011 | Iversen .................. F03D 1/003 182/142 |
| 8,083,029 B2 * | 12/2011 | Teichert .................. E04G 3/30 182/128 |
| 8,371,820 B2 * | 2/2013 | deBuhr .................. F03D 1/003 416/244 R |
| 2007/0007074 A1 * | 1/2007 | Lemburg .................. E04G 3/30 182/128 |
| 2008/0272604 A1 * | 11/2008 | Versteegh ............. F03D 1/0666 290/55 |

OTHER PUBLICATIONS

Danish Patent Office, combined Search and Examination Report issued in corresponding DK Application No. PA 2011 70130 dated Oct. 26, 2011, 4 pages.

Palmer Cosslett Putman, "Power From the Wind" 1948, Van Nostrand Reinhold company, 8 pages.

British Columbia—CBC News, "Grouse Mountain Wind Turbine Hooked Up", Sep. 22, 2010, 1 page.

Danish Wind Industry Association, "The Wind Energy Pioneers: The Gedser Wind Turbine", May 23, 2012, 2 pages.

* cited by examiner

APPARATUS FOR ACCESSING THE NACELLE OF A WIND TURBINE AND ASSOCIATED METHODS

TECHNICAL FIELD

This application relates generally to wind turbines, and more particularly to an apparatus for accessing the nacelle of the wind turbine from the tower along a route that does not extend through the upper end face of the tower, and a method of making and using such an apparatus on the wind turbine.

BACKGROUND

The typical modern wind turbine includes a tower that supports a nacelle at an upper end thereof. A rotor having a central hub and one or more blades is coupled to the nacelle and converts the kinetic energy of the wind into mechanical energy, usually in the form of a rotating main shaft. The nacelle includes various components that convert the mechanical energy from the rotor into electrical energy. For example, the nacelle generally includes a drive train and an electrical generator that collectively facilitate the production of electrical energy. More particularly, the drive train transforms the mechanical energy of the rotor into a suitable input for the electrical generator. In this regard, the drive train may include a gearbox that transforms the generally low angular velocity main shaft into a higher angular velocity secondary shaft. The secondary shaft is, in turn, operatively coupled to the electrical generator for rotating the generator rotor relative to the stator so as to produce electrical energy. The nacelle also includes various components that provide for the efficient operation of the wind turbine (e.g., pitch mechanism, yaw mechanism, brake mechanism, etc.). As such, the nacelle operates as a housing for many of the primary internal components that result in the efficient operation of the wind turbine.

During initial installation or during repair or replacement operations, there may be a need to access the interior of the nacelle. By way of example, there may be a need for personnel, such as engineers, repairmen, technicians, or the like, to gain access to the interior of the nacelle. Moreover, there may be a need to transport various pieces of equipment to the interior of the nacelle. This may include, for example, original components, replacement components, spare parts, tools, and the like. There may also be a need to transport personnel and various pieces of equipment out of the interior of the nacelle at the end of an install or repair operation. Conventionally, the transportation of personnel and equipment to or from the interior of the nacelle is achieved through the tower. More particularly, the tower may include an internal lift system (e.g., elevator or the like) that transports personnel and/or equipment from the bottom of the tower, which may be conveniently accessed through a door or hatch adjacent the base of the tower, to the upper end of the tower, and vice versa. The tower is typically open at its upper end face and this opening has traditionally provided the access point to the interior of the nacelle.

However, accessing the nacelle through the opening in the upper end face of the tower has certain limitations and drawbacks. By way of example, as the size of wind turbines increases, the size of the drive train, generator, and associated components within the nacelle also increases, thereby limiting the available space for the access opening within the nacelle. Moreover, it is often desirable to locate the drive train adjacent the front wall of the nacelle through which the main shaft extends (i.e., the wall that confronts the wind turbine rotor). Such a location, however, places the drive train adjacent the opening in the upper end face of the tower. Thus, the drive train and associate components are rapidly encroaching upon the opening in the tower, making access therethrough more difficult and problematic. For example, it is becoming more difficult to transport larger components, spare parts, etc. through the opening in the upper end face of the tower due to the crowded conditions in the nacelle adjacent the opening.

In addition to the above, on rare occasions, there may be a need to evacuate injured personnel from the nacelle. However, evacuating injured personnel from the nacelle through the opening in the upper end face of the tower can in some cases be problematic. In this regard, due to the location and size restriction, it may be difficult to transport stretchers and other emergency equipment through the opening in the upper end face of the tower. For example, a stretcher may have to be rotated toward its vertical orientation in order to pass through the opening in the upper end face of the tower. However, when an injured person is loaded onto the stretcher, it may be undesirable to position the stretcher in a vertical orientation or toward a vertical orientation in order to allow the stretcher to pass through the opening. Thus, the evacuation of injured personnel from the nacelle and through the tower can present certain challenges in current wind turbine designs.

Accordingly, Applicant has appreciated that there may be a need for an apparatus and associated methods that provide for improved access to the nacelle of the wind turbine via the tower in a manner that overcomes the drawbacks and problems associated with the conventional access route. More particularly, Applicant has appreciated that there may be a need for an apparatus and associated methods that provide access to the interior of the nacelle from the tower along a route that does not extend through the opening in the upper end face of the tower.

SUMMARY

A wind turbine that addresses these and other shortcomings includes a tower having an interior, an exterior, a lower end and an upper end; a nacelle coupled to the tower adjacent the upper end thereof and movable relative to the tower to define a least two yaw positions of the nacelle; a rotor coupled to the nacelle and including a hub and at least one blade extending therefrom, the rotor configured to interact with the wind to rotate the rotor; and an access apparatus disposed about the tower adjacent the upper end thereof, the access apparatus defining a passageway into the nacelle that is exterior of the tower, and the access apparatus providing access to the nacelle in the at least two yaw positions of the nacelle. The access apparatus may be coupled to the nacelle and therefore move relative to the tower with movement of the nacelle. In this way, the access apparatus may provide access to the nacelle for all yaw positions of the nacelle (e.g., a full 360 degrees of rotation).

The tower may include at least one sidewall that defines the interior and exterior of the tower and further include a first door in the at least one sidewall adjacent the lower end of the tower, and a second door in the at least one sidewall adjacent the upper end of the tower, the first and second doors providing an access path between the interior and exterior of the tower, wherein the second door is accessible from within the access apparatus. In one embodiment, the access apparatus includes a housing having a bottom wall and at least one sidewall that defines a housing interior, the passageway providing communication between the interior of the housing and an interior of the nacelle. The passageway of the access apparatus may extend beyond a periphery of a main housing portion and include, in one embodiment, a staircase. In one embodiment, the at least one sidewall of the housing may include a plurality of upright supports and one or more cross supports to provide the access apparatus with a cage-like appearance. In an alternative embodiment, however, the at least one sidewall of the housing may have a solid construction to provide the access apparatus with a tube-about-a-tube appearance. The said sidewall may further include a port having a transparent covering so as to allow one to see out of the access apparatus. Due to the relative movement between the tower and the access apparatus, an occluding member may be provided to fill the gap between the bottom wall of the housing and the tower and thereby reduce the likelihood of items falling from the access apparatus.

In a further embodiment, the wind turbine may further include an emergency evacuation system for evacuating personnel from the nacelle along a route exterior to the tower. This may, for example, expedite the evacuation process. In one embodiment, the emergency evacuation system may include a closure member formed in the access apparatus and selectively movable between an opened position and a closed position. When the closure member is in the opened position, a communication path is established between the interior of the access apparatus and the exterior of the access apparatus sufficient to evacuate personnel therefrom. When the closure member is in the closed position, the communication path is closed off. The emergency evacuation system further includes a lift system capable of supporting and moving a load from the access apparatus toward the lower end of the tower. In one embodiment, the lift system may include a controllable winch and a cable spooled about the winch. A carriage may also be provided configured to be coupled to the cable and facilitate transporting the load. In certain embodiments, various emergency indicators may be provided for guiding personnel from the nacelle in the event of an emergency. The emergency indicators may include lights; signage, including text, symbols, pictures, etc.; a noise generator; or combinations thereof.

In still a further embodiment in accordance with aspects of the invention, a method of transporting equipment or personnel to a nacelle of a wind turbine includes: i) positioning the nacelle in a first yaw position; ii) transporting the equipment or personnel from a lower end of a wind turbine tower to an upper end of the wind turbine tower through an interior of the tower; iii) further transporting the equipment or personnel through an opening in a sidewall of the tower and into an interior of an access apparatus adjacent an upper end of the tower and exterior of the tower; iv) further transporting the equipment or personnel from the interior of the access apparatus to the interior of the nacelle along a passageway in the access apparatus that is exterior to the tower; v) positioning the nacelle in a second yaw position different from the first yaw position; and vi) performing at least step iv) when in the second yaw position. In one embodiment, the opening in the sidewall of the tower may be aligned with the passageway in the access apparatus when in the first yaw position to facilitate the movement of long items, for example, into the nacelle. When so aligned, a conveyor system may be used to aid in the transportation of equipment to the nacelle. Additionally, in accordance with the method, the access apparatus may be moved with movement of the nacelle as the nacelle is moved from the first yaw position to the second yaw position. Moreover, it should be realized that equipment or personnel may be transported out of the nacelle along a path that is reversed relative to the path used to transport equipment and personnel to the nacelle.

In yet another embodiment in accordance with the invention, a method for assembling a wind turbine, including at least a tower, a nacelle, and an access apparatus, includes coupling the access apparatus to the tower using temporary anchoring devices; coupling one end of the tower to a foundation; coupling the nacelle to the other end of the tower; coupling the access apparatus to the nacelle so that the access apparatus is secured thereto; and removing the temporary anchoring devices so that the access apparatus is capable of moving relative to the tower. In one embodiment, the access apparatus may be coupled to the tower prior to the tower being coupled to the foundation.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
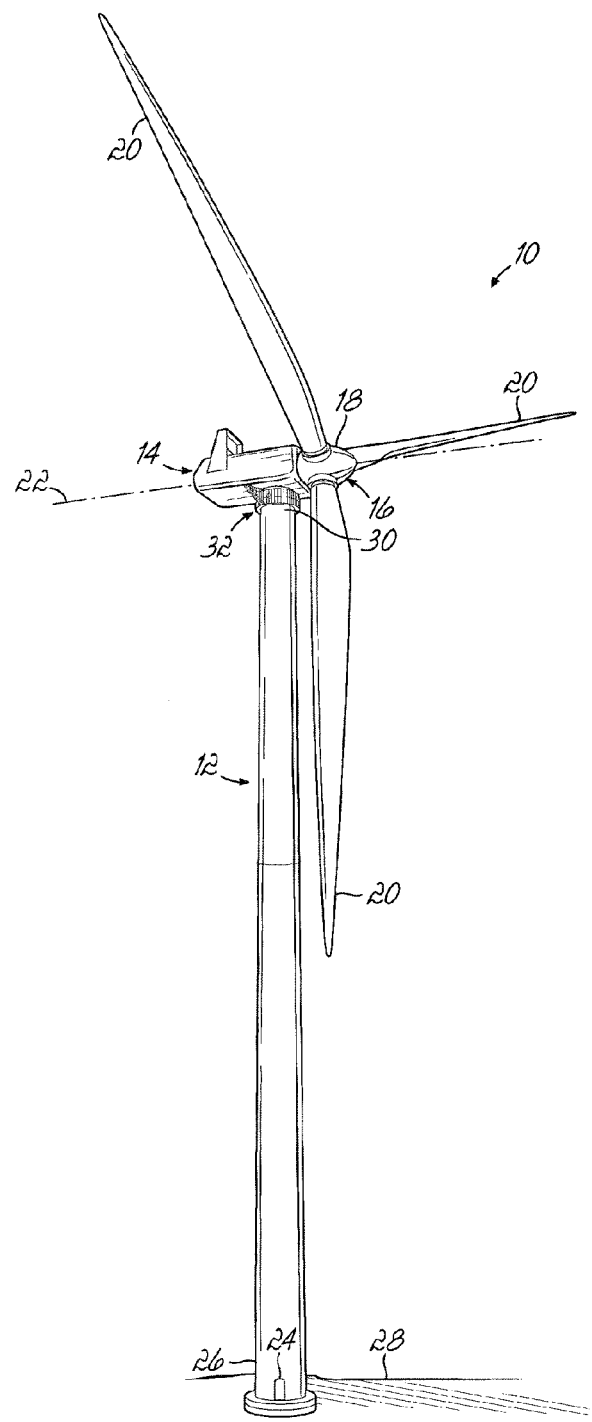
FIG. 1 is a diagrammatic view of a wind turbine having an access apparatus in accordance with one embodiment of the invention.

With reference to FIG. 1 and in accordance with an embodiment of the invention, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14, and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 18 and at least one blade 20 that projects outwardly from the central hub 18. In the representative embodiment, the rotor 16 includes three blades 20 at locations circumferentially distributed thereabout, but the number may vary. The blades 20 are configured to interact with the passing air flow to produce lift that causes the central hub 18 to spin about a longitudinal axis 22. The design and construction of the blades 20 are familiar to a person having ordinary skill in the art and will not be further described. The rotor 16 is mounted on an end of a main rotary shaft (not shown) that extends into the nacelle 14 and is rotatably supported therein by a main bearing assembly (not shown) coupled to the framework of the nacelle 14. The main rotary shaft is coupled to a drive train (not shown) having as an input the relatively low angular velocity main rotary shaft, and having as an output a higher angular velocity secondary rotary shaft (not shown) that is operatively coupled to the generator.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

As mentioned above, the conventional route for transporting personnel and equipment to the nacelle 14 is via the tower 12. As illustrated in FIG. 1, the wind turbine 10 includes a door or hatch 24 located at a lower end 26 of the tower 12 for accessing the interior of the tower 12 adjacent the ground 28 or other surface, such as a platform of an off-shore wind turbine installation (not shown). The tower 12 includes an internal lift system, such as an elevator (not shown), for transporting personnel and equipment from the lower end 26 of the tower 12 toward an upper end 30 of the tower 12, and vice versa. Such lift systems are well known in the art and thus will not be described in further detail.

Figure 2:
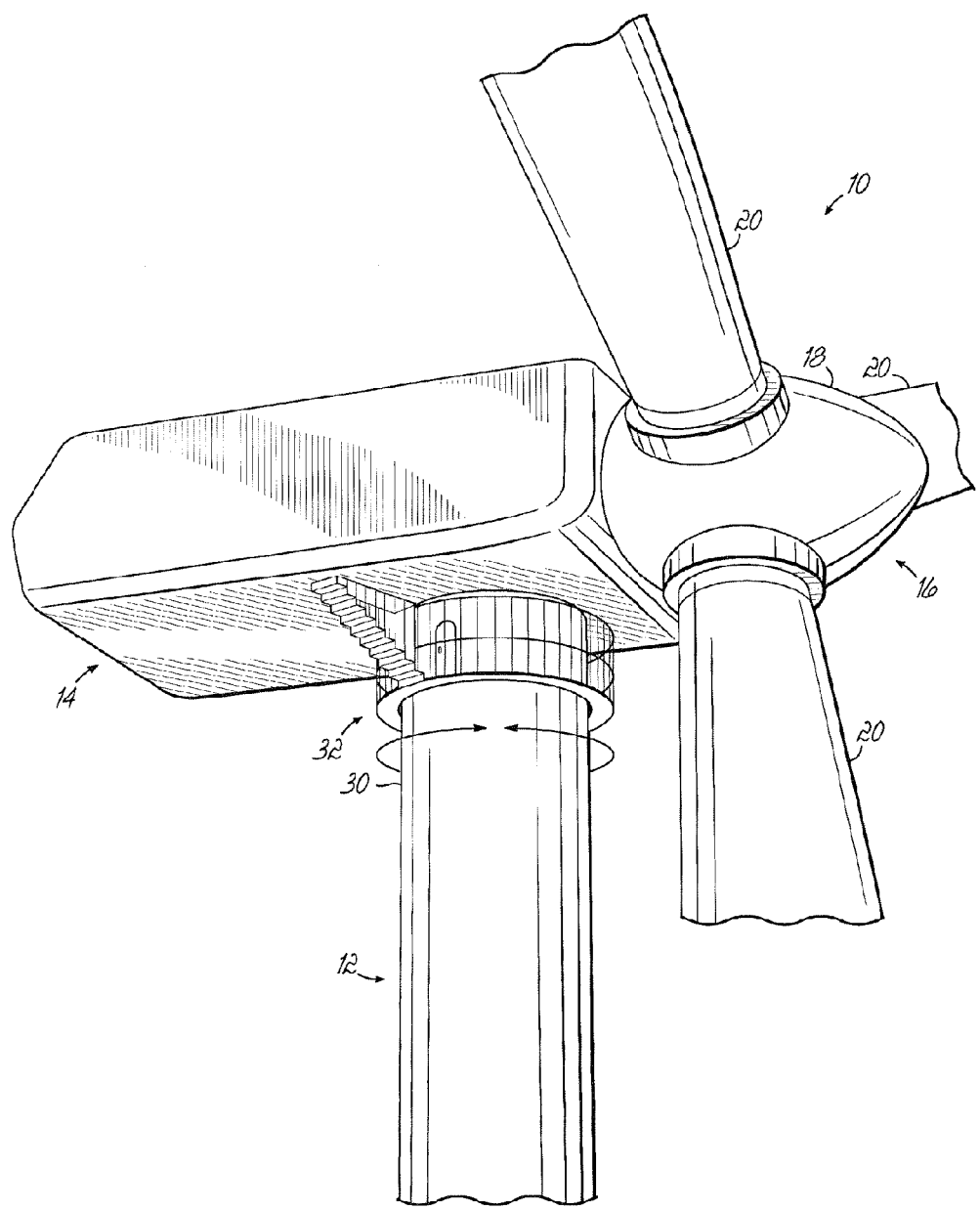
FIG. 2 is a perspective view of an upper portion of the wind turbine of FIG. 1.
Figure 3:
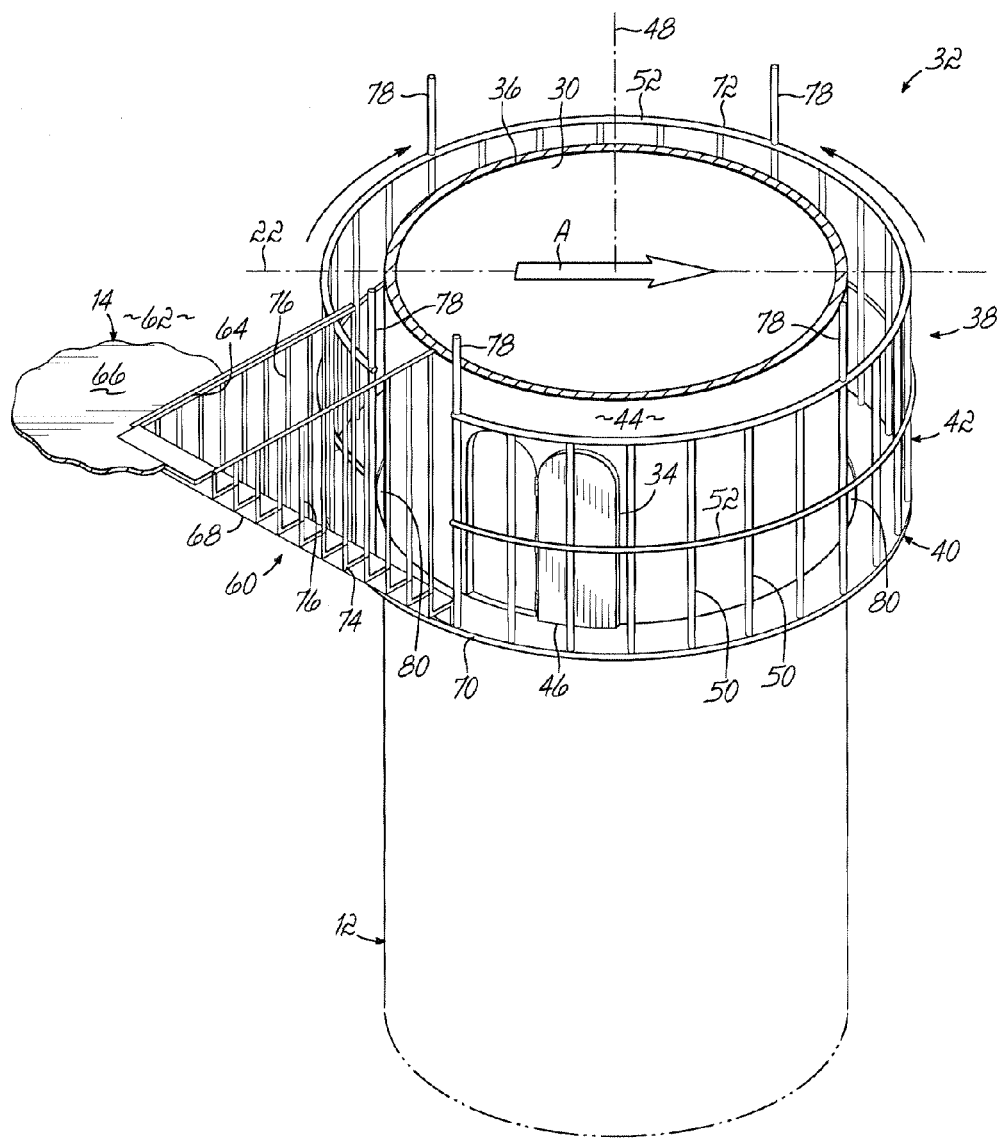
FIG. 3 is an enlarged perspective view of the access apparatus shown in FIGS. 1 and 2 in a first yaw position and with most of the nacelle removed for clarity.

In accordance with one embodiment of the invention, and as illustrated in FIGS. 1-3, the wind turbine 10 includes an access apparatus, generally shown at 32, for accessing the interior of the nacelle 14 in an improved manner. In one aspect of the invention, the interior of the nacelle 14 is not accessed through an opening in the upper end face (not shown) of the tower 12, as is conventional, but instead is accessed via a route that is exterior to the periphery or envelope of the tower 12 (e.g., accessed from outside of the tower 12). In this regard, the tower 12 includes a door or hatch 34 in a sidewall 36 thereof adjacent the upper end 30 that provides communication between the interior and exterior of the tower 12. The internal lift system is configured to be positionable adjacent the door 34 such that personnel and equipment may be transported therethrough. To this end, the doors 24, 34 may be appropriately sized such that personnel and desired equipment, including various original components, replacement components, spare parts, tools, safety equipment, etc. may pass through the respective openings associated with doors 24, 34. The size and construction of such doors are generally well known in the art and will not be discussed in further detail.

In reference to FIG. 3, the access apparatus 32 generally includes a housing 38 disposed about the tower 12, and more particularly generally coaxially disposed about the sidewall 36 thereof adjacent the upper end 30 of tower 12. The housing 38 generally includes a bottom wall 40 and at least one sidewall 42 extending therefrom so as to collectively define a housing interior 44 between the tower sidewall 36 and the at least one sidewall 42 of the housing 38. The housing 38 may be positioned relative to the tower 12 such that the door 34 adjacent the upper end 30 is in communication with the interior 44 of the housing 38. In this way, personnel and equipment on the internal lift system may be moved from the interior of tower 12 to the interior 44 of the housing 38, or vice versa, through the opening of door 34.

In one embodiment, the housing 38 may be configured such that the bottom wall 40 has a generally horizontal orientation so as to facilitate supporting personnel and equipment thereon. In an alternative embodiment, however, the bottom wall 40 may be slightly angled relative to horizontal toward or away from tower 12, for example, such that water or other liquids drain away from the access apparatus 32. As noted above, the bottom wall 40 may be located so as to be generally aligned with, or be slightly below a lower edge 46 of door 34 (and the door opening). For example, in the case that the bottom wall 40 is generally aligned with the lower edge 46 of the door 34, equipment may be more easily transported off/onto the internal lift system and into/from the interior 44 of the housing 38, such as with a cart or other wheeled device. However, the location of the bottom wall 40 relative to the door 34, or its lower edge 46, is not so limited, as there may be a slight spacing therebetween, for example.

In one embodiment, the bottom wall 40 may have a substantially solid construction, as is illustrated in the figures. In an alternative embodiment, however, the bottom wall 40 may not be solid, but may have a grated construction or other construction that provides a plurality of relatively small openings therethrough. Such a configuration provides sufficient support for the loads from personnel and equipment being transported to/from the nacelle 14, yet allows water, air and other fluids to readily pass through the bottom wall 40 and, in the case of liquids, drain away from the access apparatus 32 so as to prevent liquids from collecting therein.

In an exemplary embodiment, the sidewall 42 of housing 38 may be generally parallel to, but spaced from (via at least the bottom wall 40) the sidewall 36 of the tower 12 (e.g., substantially vertical). The invention, however, is not so limited, as the sidewall 42 of housing 38 may have other configurations. By way of example, the sidewall 42 of housing 38 may be angled relative to the sidewall 36 of tower 12 so as to converge or diverge in a generally vertical direction, or in a direction generally parallel to a longitudinal axis 48 of the tower 12. Such an arrangement results in a conical configuration to sidewall 42 of housing 38 (not shown). It should be recognized that other configurations of sidewall 42 may also be possible and remain within the scope of the present invention.

Similar to above, in one embodiment, the at least one sidewall 42 of housing 38 may have a grated configuration (e.g., cage-like appearance), including a plurality of upright supports 50 rigidly connected to one or more cross supports 52, as is illustrated, for example, in FIG. 3. Such a configuration allows fluids, such as water and air, to readily pass through the sidewall 42, yet provides sufficient support to retain personnel and equipment within the interior 44 of the housing 38. Such an open configuration to sidewall 42 may also reduce the forces (e.g., wind forces) imposed on the wind turbine 10 due to the presence of the access apparatus 32 by allowing air to readily pass therethrough, for example.

Figure 4:
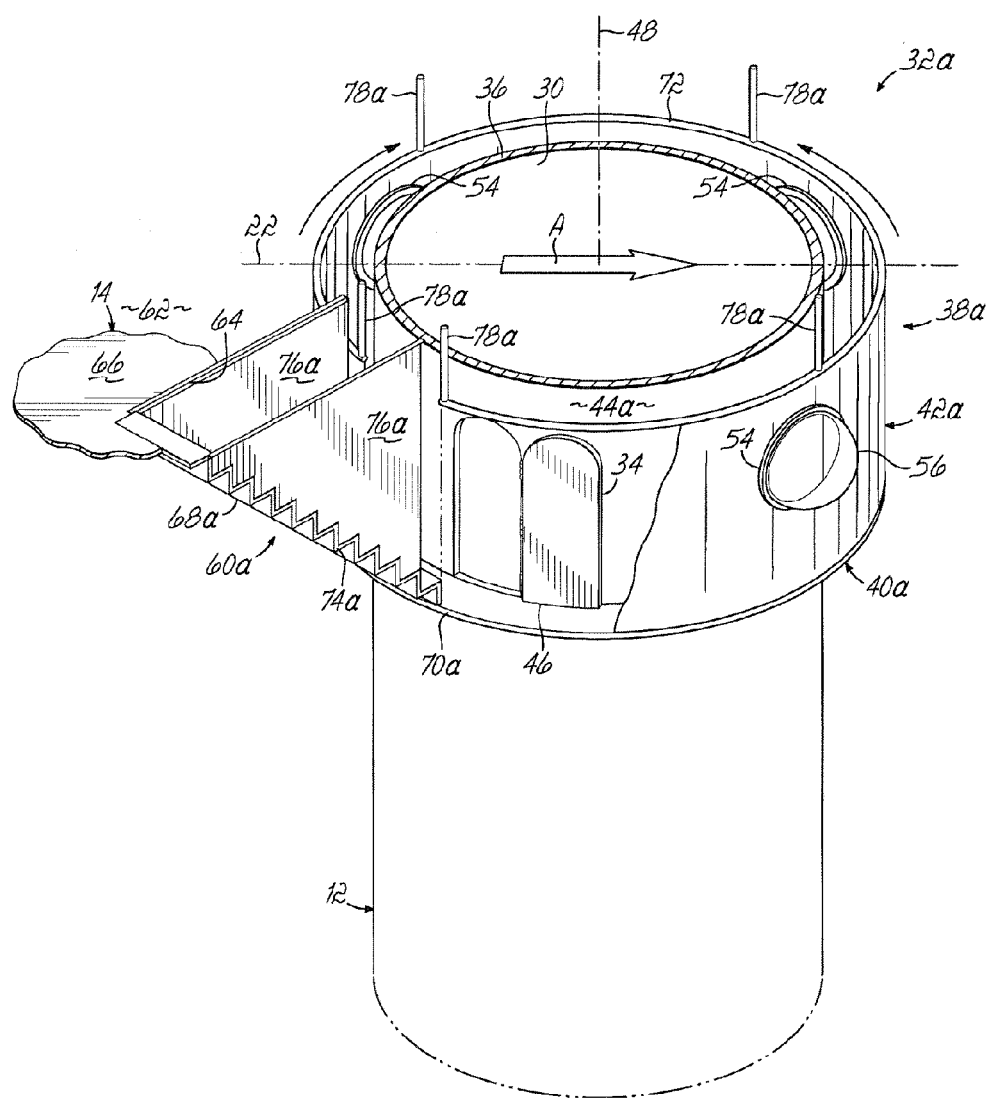
FIG. 4 is an enlarged perspective view of an access apparatus similar to FIG. 3 in accordance with another embodiment of the invention.

An alternative embodiment is illustrated in FIG. 4, in which like features have like reference numerals relative to FIG. 3, but suffixed with the letter a (reference numbers to the tower 12 have not been suffixed by the letter a). In this embodiment, the sidewall 42a of housing 38a may have a generally solid construction that, in essence, substantially encloses the space at the upper end 30 of the tower 12, and separates the housing interior 44a from the external environment. Such a closed configuration shields the interior 44a of housing 38a from the external environment, but may also impose increased loads, such as wind loads, on the wind turbine 10 as a result of the closed design. To enhance visibility from the access apparatus 32a, the sidewall 42a of housing 38a may include one or more openings or ports 54. Additionally, the ports 54 may include a covering 56, which may be transparent so that personnel in the access apparatus 32a may see out. In one embodiment, the covering 56 may have a bubble configuration to provide enhanced visualization in a wide range of directions (including, for example, downwardly toward the ground or sea). This closed design gives the access apparatus 32a a tube-about-a-tube type of appearance.

In one embodiment, the housings 38, 38a may be shaped so as to generally correspond to the shape of the tower 12. Thus, in one embodiment, and as illustrated in the FIGS. 3 and 4, the housings 38, 38a may be generally circular in shape. However, this shape is merely exemplary as the housings 38, 38a may have other shapes, at least along the outer periphery of the housings 38, 38a. For example, the housings 38, 38a, may have a square, rectangular, pentagonal, hexagonal, octagonal, etc. shape (not shown). Additionally, the access apparatus 32, 32a may be made of a variety of materials suitable for withstanding the loads imposed thereon. By way of example and without limitation, to maintain the weight of the access apparatus 32, 32a relatively low, the access apparatus 32, 32a may be formed from polymeric materials, glass fiber materials, combinations thereof and/or other suitable strong, light-weight materials. The access apparatus 32, 32a may also be formed from other structural materials including steel and/or other metals. While further features and aspects of the invention will be described below in reference to access apparatus 32, it should be recognized that many, if not all, features and aspects may also be implemented in access apparatus 32a. Those of ordinary skill in the art will readily recognize how to incorporate such features and aspects into the alternative embodiment of access apparatus 32a shown in FIG. 4.

Figure 5:
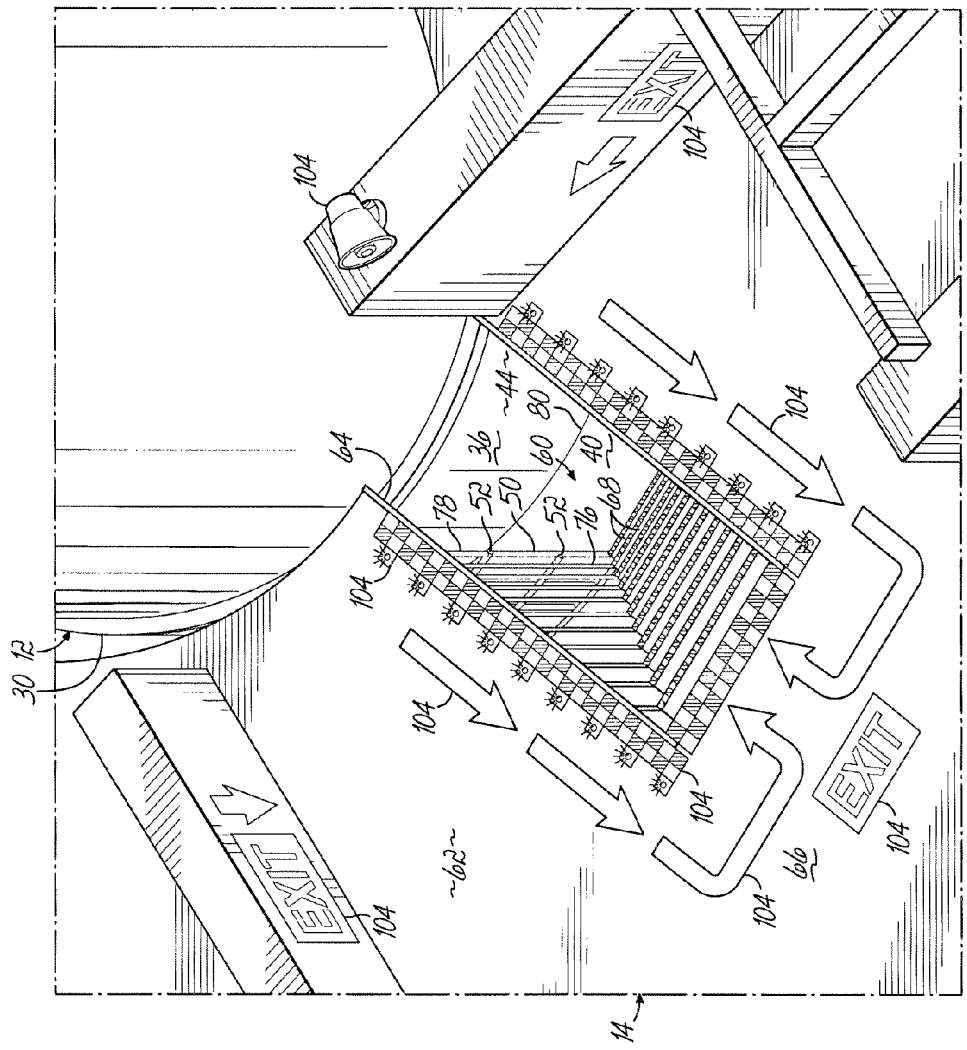
FIG. 5 is a perspective view of the access apparatus shown in FIG. 3 from the vantage point of the interior of the nacelle.

Referring back to FIG. 3, and in further reference to FIG. 5, the housing 32 includes a passageway 60 that provides a communication path between the interior 44 of the housing 38 and the interior 62 of the nacelle 14. In this regard, the nacelle 14 includes an opening 64 in communication with the passageway 60 so that personnel and equipment may be transported to/from the interior 62 of the nacelle 14. In a particularly advantageous aspect, the opening 64 in the nacelle 14 is not located directly atop the tower 12, where, as explained above, space limitations may be an issue. Instead, the opening 64 in the nacelle 14 may be selectively chosen away from or spaced from the tower 12 (e.g., exterior to the tower 12), where space may be more readily available, conditions less crowded, and access thereto less encumbered by internal components of the wind turbine 10. In other words, the access apparatus 32 allows the opening 64 in the nacelle 14 to be more strategically chosen so as to overcome many of the drawbacks in the current designs.

By way of example, the opening 64 may be located in the lower surface or floor 66 of the nacelle 14 outside the periphery or envelope of the tower 12. Although not shown, it should be realized that the nacelle 14 may include a movable cover, such as a door, hatch, slide, flaps, gate, etc. for selectively covering or uncovering the opening 64 in the nacelle 14. The cover may include a lock mechanism that secures the cover in the closed position when, for example, the access apparatus 32 is not being utilized to access the nacelle 14. The cover may also prevent water, dirt, moisture, and other debris from undesirably entering the interior 62 of the nacelle 14 when the access apparatus 32 is not in use. In any event, the cover may be moved out of the way to provide an unencumbered path from the interior 44 of the housing 38 to the interior 62 of the nacelle 14.

The passageway 60 extending between the interior 44 of the housing 38 and the opening 64 to the nacelle 14 may take several forms. For example, in one embodiment illustrated in FIG. 3, the passageway 60 may take the form of a staircase having a plurality of stairs 68. As with other aspects of the access apparatus 32, the stairs 68 may have a grated or a solid configuration (solid shown). Additionally, the passageway 60 may have any suitable width that will adequately serve the needs of transporting personnel and equipment to/from the nacelle 14. For example, the passageway 60 may have a width of between approximately 0.8 meters to approximately 1.2 meters. This range is exemplary and other values may be used depending on the specific applications and needs. In any event, the passageway 60 may be designed so as to satisfy the requirements of applicable codes or regulations in the country, region, etc. where the wind turbine 10 is situated. For example, the passageway 60 may include any required or desired hand railing (not shown) or other features required by applicable codes or regulations, including acceptable inclination values. The invention is not limited to stairs as the passageway 60 may take other forms depending on the specific application. In this regard, the passageway 60 may take the form of a ramp or other sloping surface that would allow the transport of personnel and equipment to/from the nacelle 14 (not shown).

As illustrated in FIG. 3, the passageway 60 may extend beyond a periphery 70 of a main housing portion 72. In this case, the boundary or side edges 74 of the passageway 60 may include a sidewall 76 so as to aid in the retention of personnel and/or equipment within the access apparatus 32, and the passageway 60 more particularly. In this regard, the sidewalls 76, 76a may have a grated configuration, as shown in FIG. 3, or a solid configuration, as shown in FIG. 4, similar to that described above in reference to the sidewalls 42, 42a of housings 38, 38a, respectively.

In another aspect in accordance with embodiments of the invention, the access apparatus 32 is not rigidly affixed to the tower 12, but instead is rigidly affixed to the nacelle 14 of the wind turbine 10. In other words, the access apparatus 32 effectively operates as an appendage extending downwardly from the bottom of the nacelle 14 and is non-connectably disposed about the tower 12 adjacent the upper end 30 thereof. To this end, the access apparatus 32 may include any number of mechanical connectors, schematically shown at 78, for rigidly coupling the access apparatus 32 to the nacelle 14. The mechanical connectors 78 may include without limitation one or more brackets, braces, clamps, plates, support struts or rods, cables, nuts, bolts, welds, rivets, etc that facilitate the coupling of the access apparatus 32 to the external shell or framework of the nacelle 14.

Figure 6:
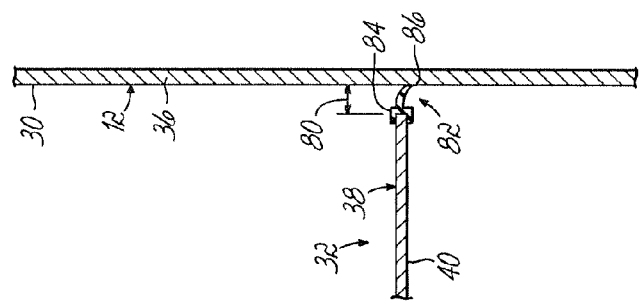
FIG. 6 is a partial, cross-sectional view of the access apparatus shown in FIG. 3 illustrating an occluding member between the access apparatus and the tower.

As best illustrated in FIG. 6, so as to allow the access apparatus 32 to freely rotate with the nacelle 14 and relative to tower 12, the bottom wall 40 of housing 38 may be spaced from the sidewall 36 of the tower 12 to define a gap 80. The gap 80 may be, for example, approximately 5 cm, depending on the particular application. The gap 80 may provide an escape path for smaller pieces of equipment, such as tools and the like, to fall from the access apparatus 32. To prevent or reduce the likelihood of such an event, the access apparatus 32 may include an occluding member 82 configured to cover or close the gap 80. The occluding member 82 essentially prevents items from falling through the gap 80, but yet does not unduly interfere with the relative rotation between the housing 38 and the tower 12. In one embodiment, for example, the occluding member 82 may include a generally flexible elastomeric member coupled to the inner edge 84 of the bottom wall 40 and extending inwardly toward the sidewall 36 of the tower 12. An inner edge 86 of the occluding member 82 may, for example, contact the sidewall 36 of the tower 12. Nevertheless, the general compliant nature of the elastomeric member allows the access apparatus 32 to rotate relative to the tower 12 with minimal interference.

The design of access apparatus 32, as described above, maintains the access apparatus 32 in a fixed position relative to the nacelle 14, and more specifically, maintains the access apparatus 32 in a fixed position relative to the opening 64 in the nacelle 14. In this way, as the nacelle 14 rotates relative to the tower 12 about the longitudinal axis 48 (i.e., vary the yaw angle), the opening 64, and thus the interior 62 of the nacelle 14, may remain accessible through the interior 44 of the housing 38. More particularly, the access apparatus 32 provides at least two yaw positions of the nacelle 14 which will provide access to the interior 62 of the nacelle 14 from the tower 12. In this regard, FIG. 3 illustrates the nacelle 14 in a first yaw position relative to tower 12 (arrow A points in the direction of rotor 16). In this first yaw position, the interior 44 of the housing 38 may be put in communication with the interior 62 of the nacelle 14 when, for example, the cover to the opening 64 is removed or opened. In this way, personnel and equipment may be transported from inside the tower 12, such as via the internal lift system, to the interior 44 of the housing 38, and from there to the interior 62 of the nacelle 14 through passageway 60. Personnel and equipment may also be removed from the interior 62 of the nacelle 14 along the reverse path.

Figure 7:
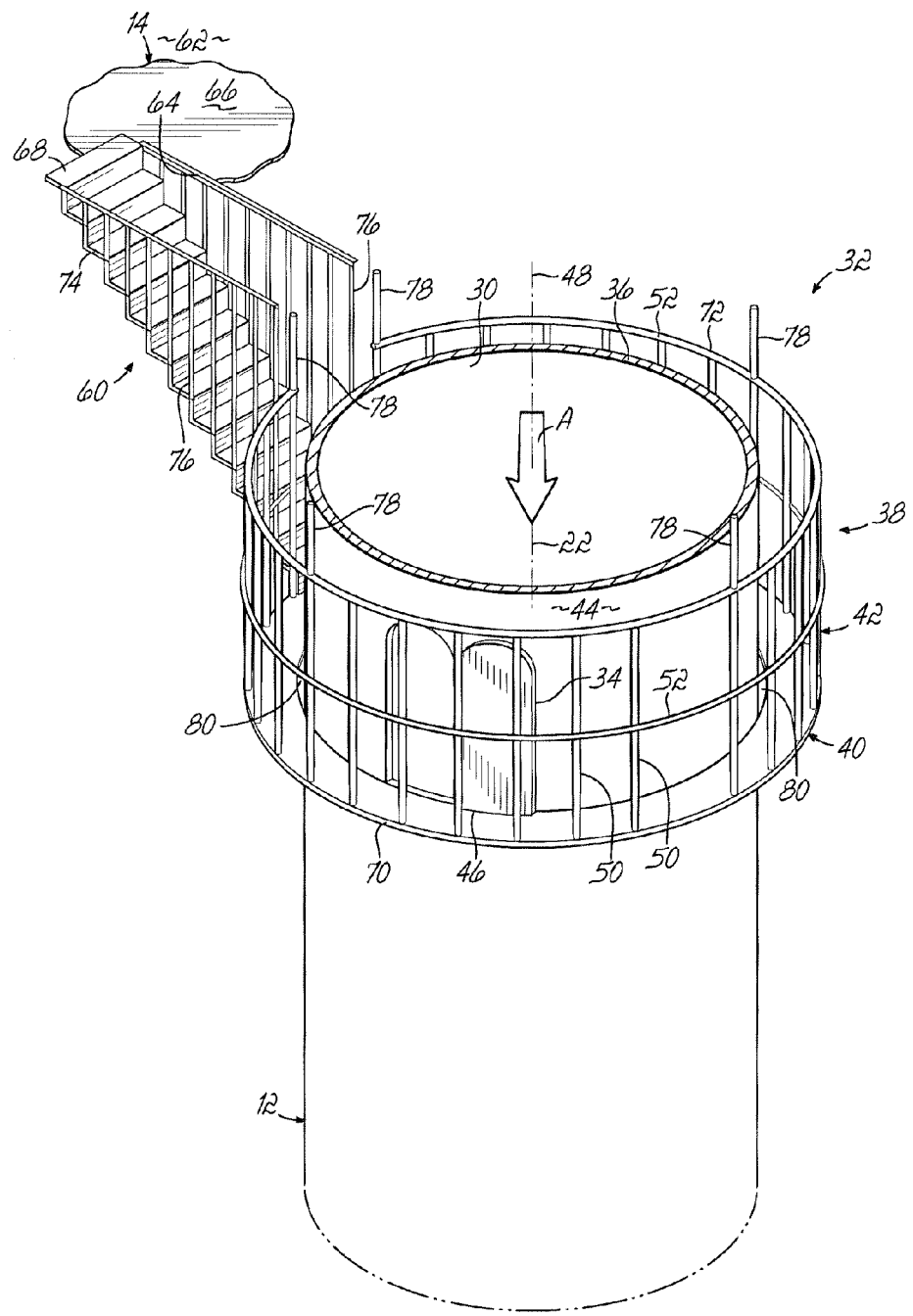
FIG. 7 is an enlarged perspective view of the access apparatus shown in FIG. 3, but in a second yaw position.

FIG. 7 illustrates the nacelle 14 in a second yaw position relative to tower 12, wherein the nacelle 14 has been rotated about longitudinal axis 48 and relative to tower 12 (e.g., compare the direction of arrow A in FIGS. 3 and 7). In this second yaw position, the interior 44 of the housing 38 may again be put in communication with the interior 62 of the nacelle 14 when, for example, the cover to the opening 64 is removed or opened. In this way, personnel and equipment may be transported from inside the tower 12, such as via the internal lift system, to the interior 44 of the housing 38, and from there to the interior 62 of the nacelle 14 through passageway 60. Personnel and equipment may also be removed from the interior 62 of the nacelle 14 along the reverse path when in the second yaw position.

As will be readily appreciated, the design of access apparatus 32 described above and shown in FIGS. 3 and 7, for example, not only provides access to the interior 62 of the nacelle 14 from the tower 12 when the nacelle 14 is in two yaw positions, but the design also provides access to the interior 62 of the nacelle 14 from the tower 12 in the full range of possible yaw positions of the nacelle 14, including a full 360 degree rotation of the nacelle 14 about tower 12. This may prove particularly advantageous in certain circumstances because movement of the nacelle to a single, predefined yaw position in order to provide access to the nacelle may be problematic in certain circumstances. For example, suppose that access to the nacelle can only be achieved when the nacelle is in a single yaw position. Further suppose that the yaw mechanism (i.e., the mechanism that rotates the nacelle relative to the tower) breaks or otherwise stops working, and therefore in need of repair, when the nacelle is not in that particular yaw position. In this case, access from the tower to the nacelle would be denied and as a result, other, perhaps more costly and time-consuming, solutions would have to be formulated to gain access to the nacelle. Such a scenario is avoided by the present design in that access to the nacelle may be achieved irrespective of the particular yaw position when access is desired.

The ability to provide access to the nacelle 14 over a wide range (if not all as in the presently disclosed design) of yaw positions may provide other advantages in the transportation of personnel and equipment to/from the nacelle 14. In this regard, and as illustrated in FIG. 3, certain advantages may be achieved when access is available when the door 34 and the passageway 60 are generally aligned (e.g., at the same azimuthal angle). For example, long pieces of equipment may be fed from the interior of the tower 12, through the door 34, directly up the passageway 60, and into the nacelle 14 when so aligned. If access was not available when the door 34 and passageway 60 were aligned, then the long piece of equipment would, in many cases, have to bend or otherwise be maneuvered with some difficulty in order to transport the long item to the interior 62 of the nacelle 14.

Additionally, it is contemplated that in certain circumstances it may be desirable to utilize a transport or conveyor system (not shown) to move equipment to/from the interior 62 of the nacelle 14. For example, when transporting a large number of equipment items, particularly heavy pieces of equipment, or bulky or awkwardly shaped items to the nacelle 14, it may be desirable to use a conveyor system. Such conveyor systems, in their simplest form, are generally linear structures and would be most applicable in use when the door 34 and passageway 60 are generally aligned. In this regard, the conveyor system could have a first end positioned adjacent the door 34 and extend up the passageway 60 so that a second end thereof terminates near opening 64. Such conveyor systems are generally known in the art and typically include a structural frame, a plurality of rotatable rollers, a continuous belt disposed about the rollers, and a motor or prime mover for driving the movement of the belt. Those of ordinary skill in the art will readily understand the construction and operation of such conveyor systems and they will not be discussed in further detail.

As noted above, in some cases evacuating injured personnel from the nacelle can be problematic in regard to conventional designs wherein stretchers or the like may have to be positioned toward their vertical orientation so as to pass through the opening to the nacelle. Such problems are addressed by the current design of access apparatus 32. In this regard, the opening 64 in the nacelle 14 may be positioned and sized to allow injured personnel and emergency equipment to pass therethrough without substantial hindrance or undesirable orientation thereof. For example, as a result of access apparatus 32, evacuating injured personnel from the nacelle 14 would not be substantially different from transporting an injured person from a second floor of a home, i.e., moving the injured person down a flight of stairs, for example. Thus, as a result of the access apparatus 32 described herein, the problematic evacuation of injured personnel, as experienced in existing wind turbine designs, may be avoided or at least significantly alleviated.

In accordance with a further aspect of the invention, the evacuation of injured personnel, or the emergency evacuation of personnel in general, may be further enhanced by the access apparatus 32. In this regard, there may be some instances where personnel, injured or otherwise, need to be evacuated from the wind turbine 10 in an expedited manner. In this regard, the access apparatus 32 may serve as a platform or station for the expedited evacuation of personnel from the wind turbine 10.

Figure 8:
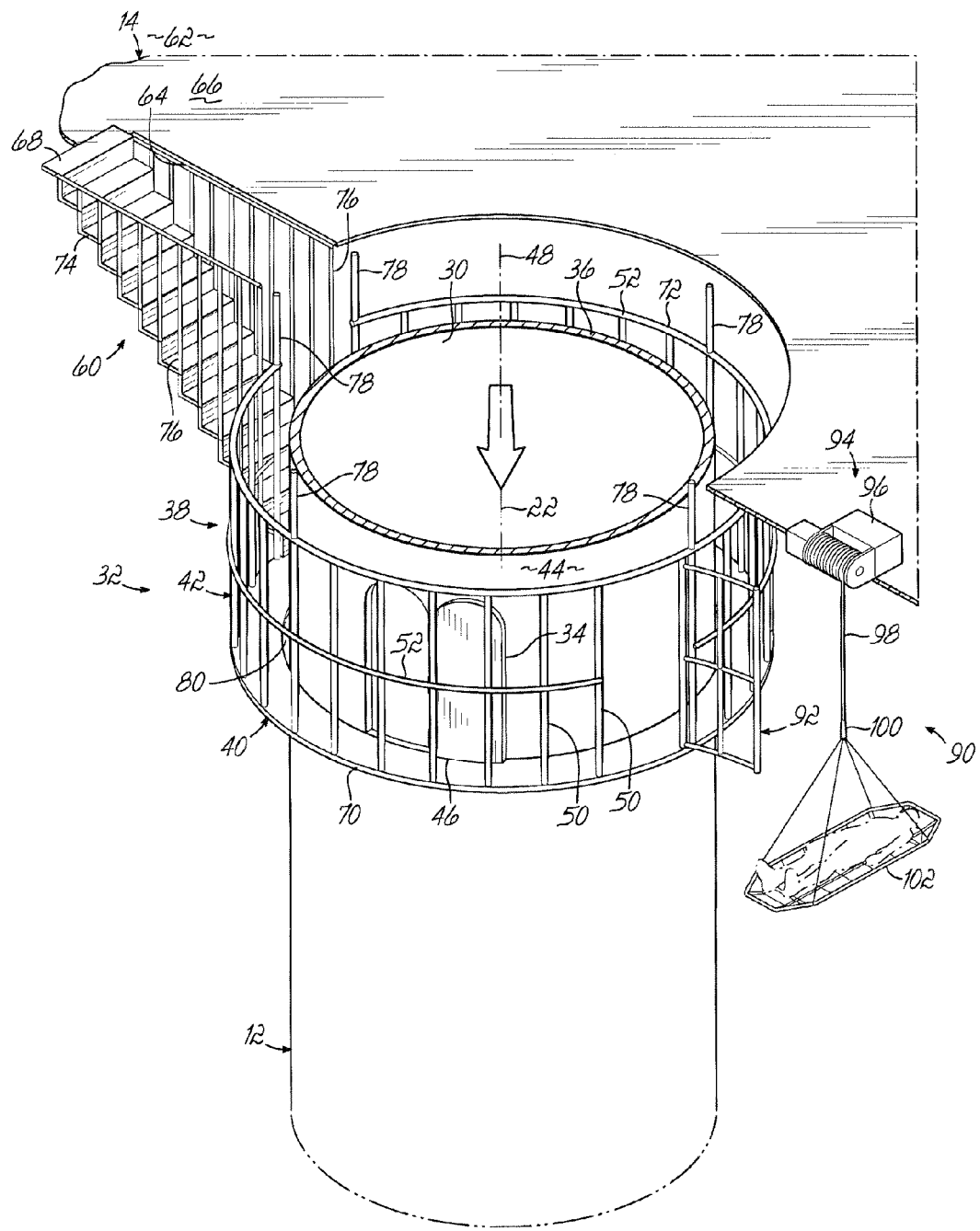
FIG. 8 is a schematic, perspective view of the access apparatus shown in FIG. 3 including an emergency evacuation system in accordance with a further embodiment of the invention.

To this end, and as illustrated in FIG. 8, in which like reference numbers refer to like features in FIG. 3, the housing 38 of access apparatus 32 may include an emergency evacuation system, generally shown at 90, configured to provide expedited evacuation of personnel from the wind turbine 10. The emergency evacuation system 90 may include an emergency cover or closure member 92 in housing 38 that provides a sufficiently large communication path between the interior 44 of housing 38 and the external environment, and a lift system 94 capable of supporting and moving a load from the access apparatus 32 to the ground 28 (or platform) at the lower end 26 of the tower 12 (FIG. 1). The closure member 92 may be located in either the bottom wall 40 (not shown) or the sidewall 42 and include without limitation, a door, hatch, slide, flaps, gate, etc. and be selectively movable between opened and closed positions. In the normal course, personnel and equipment are transported to/from the nacelle 14 via the tower 12 using, for example, the internal elevator or the like, and the closure member 92 remains in the closed position. The closure member 92 may include a lock mechanism (not shown) for securing the closure member 92 in the closed position. However, during emergency situations or other urgent situations, the closure member 92 may be opened to allow personnel to be evacuated from the access apparatus 32.

In this regard, the lift system 94 may be strategically located relative to the closure member 92 so as to be accessible when the closure member 92 is opened. In one embodiment, the lift system 94 may include a winch 96 having a length of cable 98 spooled thereabout sufficient to reach the lower end 26 of the tower 12 (FIG. 1). The winch 96 is configured so as to pay out or pay in the cable 98 in a controllable manner. To this end, one or more controllers (not shown) may be provided that control the operation of the winch 96. For example, a controller may be provided in the nacelle 14, inside the tower 12 adjacent door 34, inside the tower 12 adjacent door 24, or at a location within housing 38. Still further, the winch 96 may be controlled remotely, such as from a control room, substation, or other remote monitoring location of the wind turbine 10. Furthermore, a hand-held remote control may also be provided for controlling the operation of winch 96.

As noted above, the winch 96 may be strategically located relative to the closure member 92. For example, the winch 96 may be located in the nacelle 14, such as above the closure member 92. Alternatively, the winch 96 may be coupled to the access apparatus 32, such as in a utility box or the like (not shown). In any event, the winch 96 is configured to place the end of the cable 98 adjacent the closure member 92. To facilitate a coupling to the cable 98, the end of the cable 98 may include a hook, clasp or other connector, generally shown at 100. Additionally, a carriage 102 may be provided and configured to couple to the cable 98, such as via connector 100. The carriage 102 may be configured to, for example, transport injured personnel, and thus readily receive a stretcher or the like. In an alternate embodiment, the carriage 102 may have other configurations depending on the particular application. When not in use, the carriage 102 may be stored within the nacelle 14, within the housing 38, or other convenient location, such as within the tower 12.

In addition to the above, wind turbine 10 may include other features that facilitate the evacuation of personnel therefrom. For example, and in further reference to FIG. 5, the nacelle 14 may include one or more emergency indicators, generally shown at 104. The emergency indicators 104 may take several forms. By way of example, in one form, an emergency indicator 104 may take the form of a plurality of lights (e.g., track lights in the floor of the nacelle 14, siren, etc.) that guide personnel toward the opening 64 in the nacelle 14. An emergency indicator 104 may take the form of signs having written text, pictures, symbols, images, etc. in the nacelle 14 that identify the escape route out of the nacelle 14. Still further, the emergency indicator 104 may include a horn or other noise generator located adjacent the opening 64 to guide personnel toward the opening 64 and out of the nacelle 14 via an auditory signal. A voice control system may also be used in emergencies to guide personnel from the nacelle 14. Other emergency indicators may also be used in the nacelle 14 to facilitate evacuation of personnel therefrom.

While it is contemplated that the access apparatus 32 can be retrofitted onto existing wind turbines, in one embodiment, the access apparatus 32 may be incorporated into the construction process of new wind turbines. In this regard, in a conventional wind turbine construction, the wind turbine tower is erected first and then the nacelle is coupled to the top of the tower using a crane, for example, in a subsequent assembly step. In one embodiment, the access apparatus 32 may be coupled to the nacelle 14 prior to coupling the nacelle 14 to the tower 12. However, due to the relatively small spacing between the sidewall 36 of the tower 12 and the inner aspects of the access apparatus 32, such an assembly method may prove to be relatively difficult.

Thus, in an alternative embodiment of an assembly method, the access apparatus 32 may be coupled to the tower 12, and more particularly, the upper end 30 of the tower 12 prior to coupling the nacelle 14 to the tower 12. For example, in an exemplary embodiment, the access apparatus 32 may be coupled to the tower 12 prior to the tower 12 being erected and coupled to a supporting foundation. In an alternative embodiment, however, the access apparatus 32 may be coupled to the upper end of the tower 12 after the tower 12 has been erected. In these embodiments, the access apparatus 32 may be temporarily coupled to the upper end 30 of the tower 12 using, for example, temporary anchoring devices such as brackets, rods, plates, clamps, cables or other removable connecting elements. After the tower 12 is erected and the access apparatus 32 is positioned thereon, the nacelle 14 may be coupled to the top of the tower 12. In this regard, the mechanical connectors 78 may be used to securely couple the access apparatus 32 to the shell or framework of the nacelle 14. After the access apparatus 32 is securely coupled to the nacelle 14, the temporary anchoring devices may be removed such that the access aperture 32 is no longer supported by the tower 12, but instead is supported by the nacelle 14. Accordingly, the access apparatus 32 rotates with the nacelle 14 and relative to the tower 12.

While the access apparatus 32 was described above as being coupled to the nacelle 14 so as to rotate relative to the tower 12, other arrangements are possible. By way of example, in an alternative embodiment, the housing of the access apparatus may be coupled to the tower 12 and the passageway may be coupled to the nacelle 14. In this regard, FIG. 9, in which like reference numerals refer to like features in FIGS. 1-8, shows an access apparatus 110 disposed about the upper end 30 of the tower 12. In contrast to the previous embodiments, however, the access apparatus 110 includes a housing 112, having a bottom wall 114 and at least one sidewall 116, that is rigidly affixed to the tower 12. Accordingly, the housing 112 does not rotate with the nacelle 14, but remains spatially fixed relative to the tower 12. The housing 112 may be coupled to the tower 12 via various mechanical connectors known to those of ordinary skill in the art and includes those mentioned above.

Similar to the previous embodiments, the passageway 118 of access apparatus 110 remains rigidly affixed to the nacelle 14 of wind turbine 10, such as at an upper end thereof. However, the passageway 118 is not rigidly affixed to the housing 112, but is capable of moving relative thereto. For example, a lower end of the passageway 118 may be slidably supported on the bottom wall 114 of housing 112, or alternatively, the lower end of the passageway 118 may be rotatably supported thereon by wheels or the like (not shown). In any event, the design of access apparatus 110 maintains the passageway 118 in a fixed position relative to the nacelle 14 and the opening 64 therein.

In this way, as the nacelle 14 rotates relative to the tower 12 about the longitudinal axis 48, the opening 64, and thus the interior 62 of the nacelle 14, may remain accessible through the interior 44 of the housing 112. More particularly, the access apparatus 110 provides at least two yaw positions of the nacelle 14 which will provide access to the interior 62 of the nacelle 14 from the tower 12. Similar to the previous embodiments, the design of access apparatus 110 not only provides access to the interior 62 of the nacelle 14 from the tower 12 when the nacelle 14 is in two yaw positions, but the design may also provide access to the interior 62 of the nacelle 14 from the tower 12 in the full range of possible yaw positions of the nacelle 14.

Figure 9:
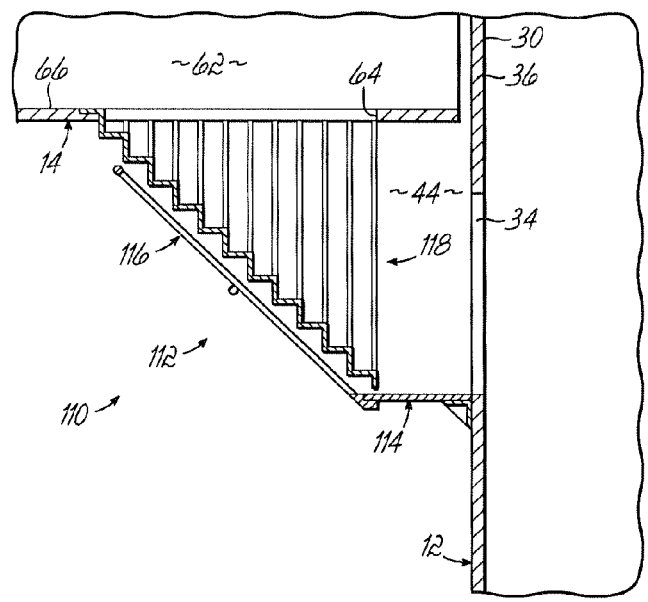
FIG. 9 is a partial, cross-sectional view of an access apparatus according to another embodiment of the invention.

Those of ordinary skill in the art will appreciate that many of the features shown and described above may also be incorporated into the embodiment shown in FIG. 9. It should also be recognized that in a further embodiment, only a portion of the housing 112 may be rigidly affixed to the tower 12 (not shown). By way of example, the bottom wall 114 of housing 112 may be rigidly affixed to the tower 12, while the at least one sidewall 116 and the passageway 118 remain rigidly affixed to the nacelle 14.

Figure 10:
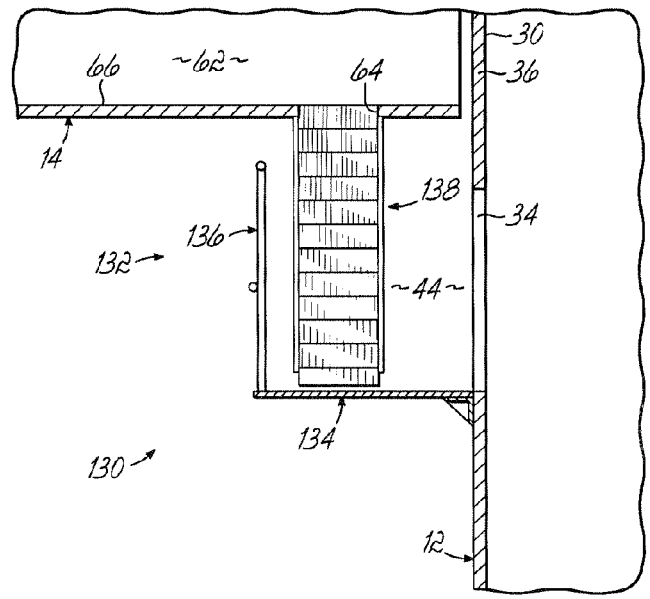
FIG. 10 is a partial, cross-sectional view of an access apparatus according to another embodiment of the invention.

In yet another alternative embodiment, as illustrated in FIG. 10, in which like reference numerals refer to like features in FIGS. 1-8, an access apparatus 130 may be disposed about the upper end 30 of the tower 12. The access apparatus 130 includes a housing 132 having a bottom wall 134, at least one sidewall 136, and a passageway 138 for accessing the interior 62 of the nacelle 14 from the housing 132. In this embodiment, and in contrast to the previous embodiments, the passageway 138 does not extend generally outwardly or radially, but instead extends generally tangentially or circumferentially. Such a design may allow the access apparatus 130 to be generally smaller. This particular feature of passageway 138 may be incorporated into the various embodiments of the access apparatus described above, e.g., wherein the entire access apparatus is affixed to the nacelle (e.g., FIGS. 1-8); wherein the housing is affixed to the tower and the passageway is affixed to the nacelle (e.g., FIG. 9); or wherein a portion of the housing is affixed to the tower and the remaining portion of the housing and the passageway are affixed to the nacelle (not shown).

While the invention has been illustrated by a description of various embodiments, and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the scope of the general inventive concept.

The invention claimed is:

1. A wind turbine, comprising:
 a tower having an interior, an exterior, a lower end, and an upper end;
 a nacelle coupled to the tower adjacent the upper end thereof and movable relative to the tower to define at least two yaw positions of the nacelle;
 a rotor coupled to the nacelle and including a hub and at least one blade extending therefrom, the rotor configured to interact with the wind to rotate the rotor; and
 an access apparatus disposed about the tower adjacent the upper end thereof, the access apparatus defining a passageway into the nacelle that is exterior of the tower, and the access apparatus providing access to the nacelle in the at least two yaw positions of the nacelle,
 wherein the tower includes at least one sidewall that defines the interior and exterior of the tower, the tower further comprising:
 a first door in the at least one sidewall adjacent the lower end of the tower; and
 a second door in the at least one sidewall adjacent the upper end of the tower,
 wherein each of the first and second doors provides an access path between the interior and exterior of the tower, and wherein the second door is accessible from within an interior of the access apparatus.

2. The wind turbine according to claim 1, wherein the access apparatus is coupled to the nacelle and moves relative to the tower with movement of the nacelle.

3. The wind turbine according to claim 1, wherein the access apparatus provides access to the nacelle for all yaw positions of the nacelle.

4. The wind turbine according to claim 1, wherein the passageway of the access apparatus includes a staircase.

5. The wind turbine according to claim 1, wherein the access apparatus further comprises:
 a housing having a bottom wall and at least one sidewall that defines a housing interior, the passageway providing communication between the interior of the housing and an interior of the nacelle.

6. The wind turbine according to claim 5, wherein the passageway extends beyond a periphery of a main housing portion.

7. The wind turbine according to claim 5, wherein the at least one sidewall includes a plurality of upright supports and one or more cross supports to provide the access apparatus with a cage-like appearance.

8. The wind turbine according to claim 5, wherein the at least one sidewall has a solid construction.

9. The wind turbine according to claim 8, wherein the at least one sidewall includes at least one port and a transparent covering for covering the port.

10. The wind turbine according to claim 5, further comprising an occluding member extending between the bottom wall of the housing and the tower, the occluding member including an elastomeric member.

11. The wind turbine according to claim 1, further comprising an emergency evacuation system for evacuating personnel from the nacelle along a route exterior to the tower.

12. The wind turbine according to claim 11, wherein the emergency evacuation system comprises:
a closure member formed in the access apparatus and selectively movable between an opened position and a closed position, a communication path being established between the interior of the access apparatus and the exterior of the access apparatus when the closure member is in the opened position, the communication path between the interior and exterior of the access apparatus being closed off when the closure member is in the closed position; and
a lift system capable of supporting and moving a load from the access apparatus to the lower end of the tower.

13. The wind turbine according to claim 12, wherein the lift system includes a winch and a cable spooled about the winch and having a sufficient length to extend from the access apparatus and the lower end of the tower.

14. The wind turbine according to claim 13, further comprising a carriage configured to be coupled to the cable to facilitate transporting the load.

15. The wind turbine according to claim 11, further comprising one or more emergency indicators for guiding personnel from the nacelle.

16. The wind turbine according to claim 15, wherein one or more emergency indicators is selected from the group consisting of a light, a sign, a noise generator, and combinations thereof.

17. A method of transporting equipment or personnel to a nacelle of a wind turbine, comprising:
i) positioning the nacelle in a first yaw position relative to a wind turbine tower having at least one sidewall;
ii) transporting the equipment or personnel through a first door in the at least one sidewall at a lower end of the tower and to an upper end of the tower through an interior of the tower;
iii) further transporting the equipment or personnel through a second door in the at least one sidewall adjacent an upper end of the tower and into an interior of an access apparatus adjacent an upper end of the tower and exterior of the tower;
iv) further transporting the equipment or personnel from the interior of the access apparatus to the interior of the nacelle along a passageway in the access apparatus that is exterior to the tower;
v) positioning the nacelle in a second yaw position different from the first yaw position; and
vi) performing at least step iv) when in the second yaw position.

18. The method according to claim 17, wherein positioning the nacelle in the first yaw position further comprises aligning the second door in the at least one sidewall of the tower with the passageway of the access apparatus.

19. The method according to claim 17, further comprising moving the access apparatus with movement of the nacelle from the first yaw position to the second yaw position.

20. The method according to claim 17, further comprising using a conveyor to transport equipment or personnel from the interior of the access apparatus to the interior of the nacelle.

21. The method according to claim 17, further comprising transporting equipment or personnel out of the nacelle along a path that is reversed relative to the path used to transport equipment and personnel to the nacelle.

* * * * *